(12) United States Patent
Tomas et al.

(10) Patent No.: US 10,738,767 B2
(45) Date of Patent: Aug. 11, 2020

(54) SYSTEM AND METHOD FOR ESTIMATING CONSUMED BATTERY LIFE OF A PITCH SYSTEM OF A WIND TURBINE

(71) Applicant: General Electric Company, Schenectady, NY (US)

(72) Inventors: Santiago Tomas, Barcelona (ES); Jeffrey Alan Melius, Roanoke, VA (US); Darren John Danielsen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 15/976,914

(22) Filed: May 11, 2018

(65) Prior Publication Data

US 2018/0340517 A1    Nov. 29, 2018

(30) Foreign Application Priority Data

May 25, 2017 (EP) ..................................... 17382298

(51) Int. Cl.
  *F03D 17/00* (2016.01)
  *F03D 7/02* (2006.01)
  *G01N 25/00* (2006.01)

(52) U.S. Cl.
  CPC ........... *F03D 17/00* (2016.05); *F03D 7/0224* (2013.01); *F03D 7/0264* (2013.01); *G01N 25/00* (2013.01); *F05B 2260/74* (2013.01); *F05B 2260/80* (2013.01); *F05B 2260/821* (2013.01); *F05B 2260/84* (2013.01); *F05B 2270/1074* (2013.01); *F05B 2270/303* (2013.01); *F05B 2270/404* (2013.01)

(58) Field of Classification Search
  CPC ................................. F03D 17/00; F03D 80/50
  See application file for complete search history.

(56) References Cited

U.S. PATENT DOCUMENTS

| 6,014,012 A | 1/2000 | Murao et al. |
| 2014/0257751 A1* | 9/2014 | Edenfeld ................. F03D 17/00 702/183 |
| 2016/0107526 A1 | 4/2016 | Jin et al. |

OTHER PUBLICATIONS

Extended European Search Report and Opinion issued in connection with corresponding EP Application No. 17382298.2 dated Nov. 27, 2017.

* cited by examiner

*Primary Examiner* — Olatunji A Godo
(74) *Attorney, Agent, or Firm* — Dority & Manning, P.A.

(57) ABSTRACT

A method for estimating consumed battery life of at least one battery of a pitch drive mechanism of a rotor blade of a wind turbine includes monitoring, via at least one sensor, an actual temperature of the battery over a predetermined time period. The method also includes storing, via a turbine controller, the monitored actual temperatures of the battery during the predetermined time period. Further, the method includes determining, via the turbine controller, the consumed battery life as a function of the monitored actual temperatures.

17 Claims, 6 Drawing Sheets

SYSTEM AND METHOD FOR ESTIMATING CONSUMED BATTERY LIFE OF A PITCH SYSTEM OF A WIND TURBINE

FIELD OF THE INVENTION

The present disclosure relates generally to wind turbines, and more particularly to systems and methods for estimating the consumed battery life of a pitch system of a wind turbine based on temperature.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, the wind turbine may adjust a pitch angle of one or more of the rotor blades via a pitch drive mechanism configured with a pitch bearing to change the angle of the blades with respect to the wind.

Typical pitch drive mechanisms include pitch drive motor, a pitch drive gearbox, and a pitch drive pinion. In such configurations, the pitch drive motor is coupled to the pitch drive gearbox so that the pitch drive motor imparts mechanical force to the pitch drive gearbox. Similarly, the pitch drive gearbox may be coupled to the pitch drive pinion for rotation therewith. The pitch drive pinion may, in turn, be in rotational engagement with the pitch bearing coupled between the hub and a corresponding rotor blade such that rotation of the pitch drive pinion causes rotation of the pitch bearing. Thus, in such embodiments, rotation of the pitch drive motor drives the pitch drive gearbox and the pitch drive pinion, thereby rotating the pitch bearing and the rotor blade about the pitch axis.

During normal operation, the pitch drive motors are driven by the power grid. However, in some instances, such as during an adverse grid event, the pitch drive motors may be driven by one or more backup batteries. If pitching of the blades relies on such batteries (i.e. due to a grid loss), it is important to ensure that the batteries are capable of operating when needed. Overtime, however, the motor batteries of the pitch drive mechanisms lose their charge and eventually die. Thus, if such batteries die without notice, the rotor blade associated with the dead batteries may become stuck since there is no power available to pitch the blade. In such instances, loads may increase on the stuck rotor blade, thereby causing damage thereto.

As such, a predictive maintenance system and method that addresses the aforementioned issues would be desired. Accordingly, the present disclosure is directed to systems and methods for estimating the consumed battery life of the pitch system of the wind turbine based on temperature.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for estimating consumed battery life of at least one battery of a pitch drive mechanism of a rotor blade of a wind turbine. The method includes monitoring, via at least one sensor, an actual temperature of the battery over a predetermined time period. The method also includes storing, via a turbine controller, the monitored actual temperatures of the battery during the predetermined time period. Further, the method includes determining, via the turbine controller, the consumed battery life as a function of the monitored actual temperatures.

In one embodiment, the battery may be stored in a battery cabinet. In such embodiments, the temperature of the battery may correspond to a cabinet temperature of the battery cabinet. Since the battery has a thermal time constant, the internal battery temperature will lag the measured temperature in the battery cabinet. Thus, the method may also include calibrating the monitored actual temperatures using a thermal model of the battery cabinet and the battery to improve accuracy. In such embodiments, the calibration can be made either in real time or performed later prior to calculating the consumed life of the battery.

In another embodiment, the step of determining the consumed battery life as a function of the monitored temperature may include determining the consumed battery life using an Arrhenius equation.

In further embodiments, the method may include averaging a subset of the monitored actual temperatures for predetermined time intervals to obtain an average temperature and determining the consumed battery life as a function of the average temperature. More specifically, in certain embodiments, the predetermined time intervals may range from about five (5) minutes to about twenty (20) minutes, e.g. such as about ten (10) minutes.

In several embodiments, the method may further include generating, via the turbine controller, an alarm signal if the consumed battery life exceeds a predetermined threshold. For example, in one embodiment, the predetermined threshold may correspond to 80% or greater of a total battery life of the battery. As such, the method may further include replacing the battery if the consumed battery life exceeds the predetermined threshold.

In yet another embodiment, the battery cabinet may contain a plurality of batteries stored therein. In such embodiments, the method may further include replacing all of the plurality of batteries in the battery cabinet if the consumed battery life exceeds the predetermined threshold.

In still further embodiments, the method may also include replacing additional batteries of pitch drive mechanisms of adjacent rotor blades if the consumed battery life exceeds the predetermined threshold.

In another aspect, the present disclosure is directed to a system for estimating consumed battery life of at least one battery of a pitch drive mechanism of a rotor blade of a wind turbine. The system includes at least one sensor configured for monitoring an actual temperature of the battery over a predetermined time period and a controller communicatively coupled to the at least one sensor. The controller includes at least one processor configured to perform one or more operations, including but not limited to storing the monitored actual temperatures of the battery during the predetermined time period and determining the consumed battery life as a function of the monitored actual temperatures.

In one embodiment, the battery (or batteries) may be stored in a thermally-isolated battery cabinet. In such embodiments, the monitored temperature of the battery may correspond to a cabinet temperature of the battery cabinet. It should also be understood that the system may further include any of the additional features and/or steps as described herein.

In yet another aspect, the present disclosure is directed to a method for preventing damaging loads from occurring during an adverse grid event of a wind turbine. The method includes monitoring, via at least one sensor, an actual temperature of at least one battery of a pitch drive mechanism of a rotor blade of the wind turbine over a predetermined time period. Another step includes storing, via a turbine controller, the monitored actual temperatures of the battery during the predetermined time period. The method also includes determining, via the turbine controller, the consumed battery life as a function of the monitored actual temperatures. Further, the method includes replacing the battery if the consumed battery life exceeds a predetermined threshold. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
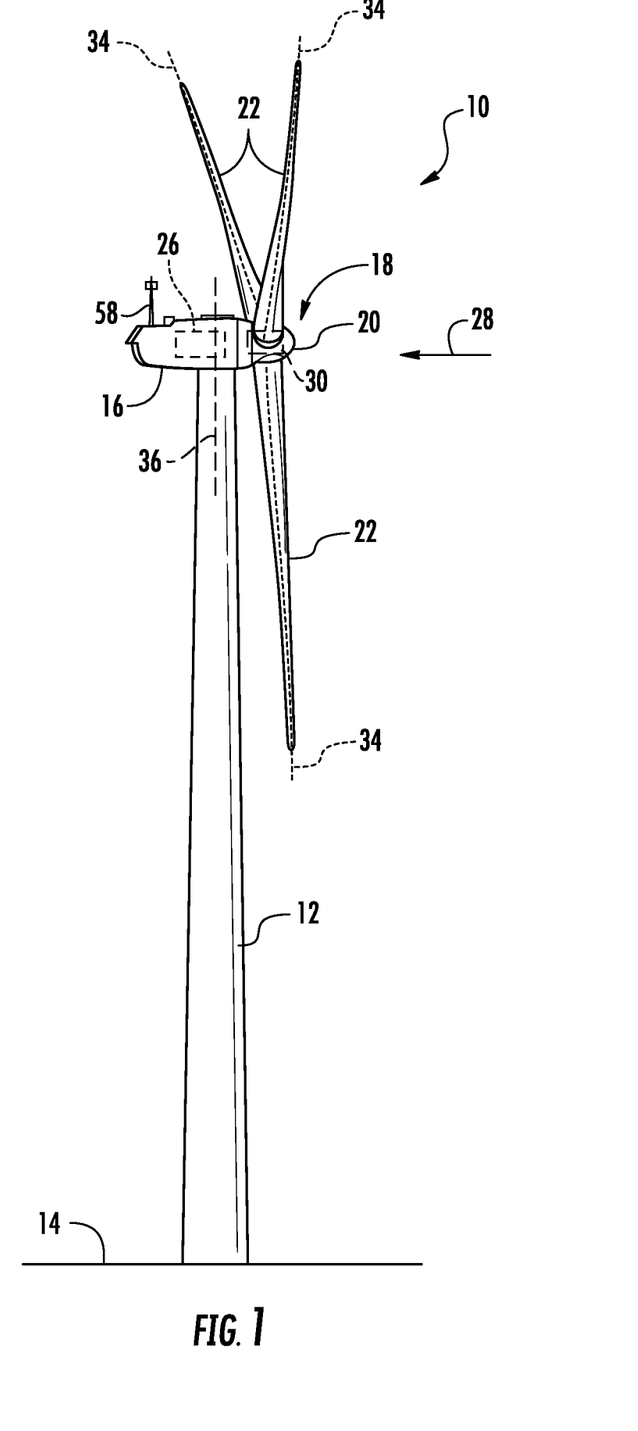
FIG. 1 illustrates a perspective view of a wind turbine according to one embodiment of the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
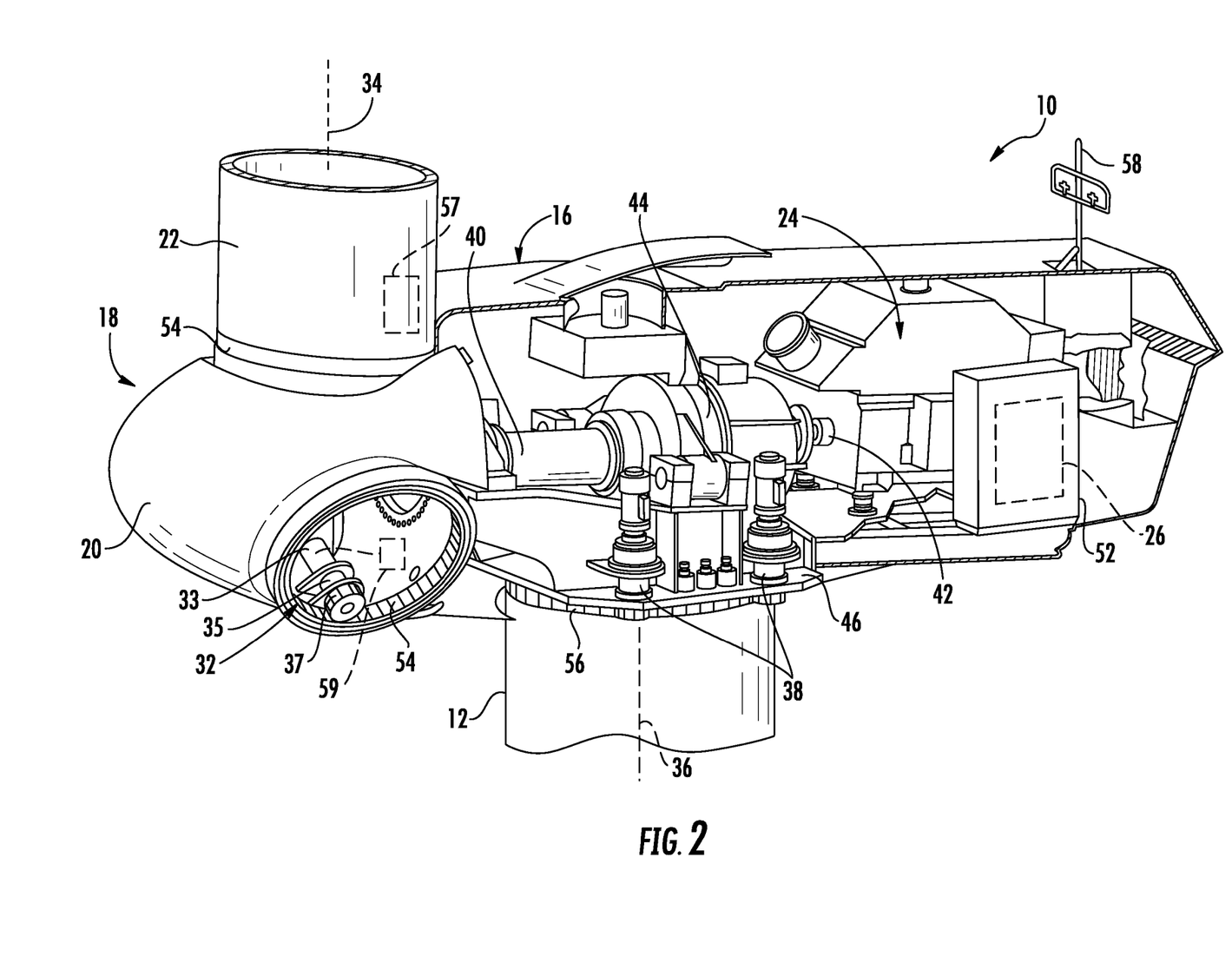
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

Further, the turbine controller 26 may also be communicatively coupled to each pitch adjustment mechanism 32 of the wind turbine 10 (one of which is shown) through a separate or integral pitch controller 30 (FIG. 1) for controlling and/or altering the pitch angle of the rotor blades 22 (i.e., an angle that determines a perspective of the rotor blades 22 with respect to the direction 28 of the wind).

In addition, as shown in FIG. 2, one or more sensors 57, 58, 59 may be provided on the wind turbine 10. More specifically, as shown, a blade sensor 57 may be configured with one or more of the rotor blades 22 to monitor the rotor blades 22. Further, as shown, a wind sensor 58 may be provided on the wind turbine 10. For example, the wind sensor 58 may a wind vane, and anemometer, a LIDAR sensor, or another suitable sensor that measures wind speed and/or direction. In addition, a pitch sensor 59 may be configured with each of the pitch drive mechanism 32, e.g. with one or more batteries of the pitch drive motors 33 thereof, which will be discussed in more detail below. As such, the sensors 57, 58, 59 may further be in communication with the controller 26, and may provide related information to the controller 26. For example, the pitch sensor(s) 59 may correspond to temperature sensors that send temperature signals to the controllers 26, 30 to indicate an actual temperature of the pitch batteries, which is described in more detail herein.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
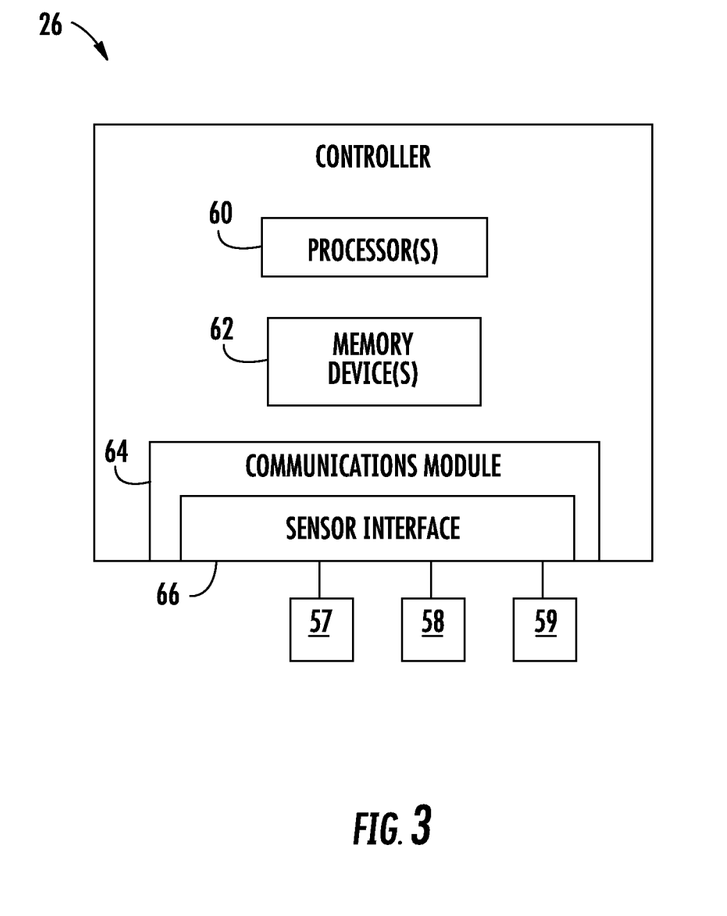
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device (s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58, 59 to be converted into signals that can be understood and processed by the processors 60. It should be appreciated that the sensors 57, 58, 59 may be communicatively coupled to the communications module 64 using any suitable means. For example, as shown in FIG. 3, the sensors 57, 58, 59 are coupled to the sensor interface 66 via a wired connection. However, in other embodiments, the sensors 57, 58, 59 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
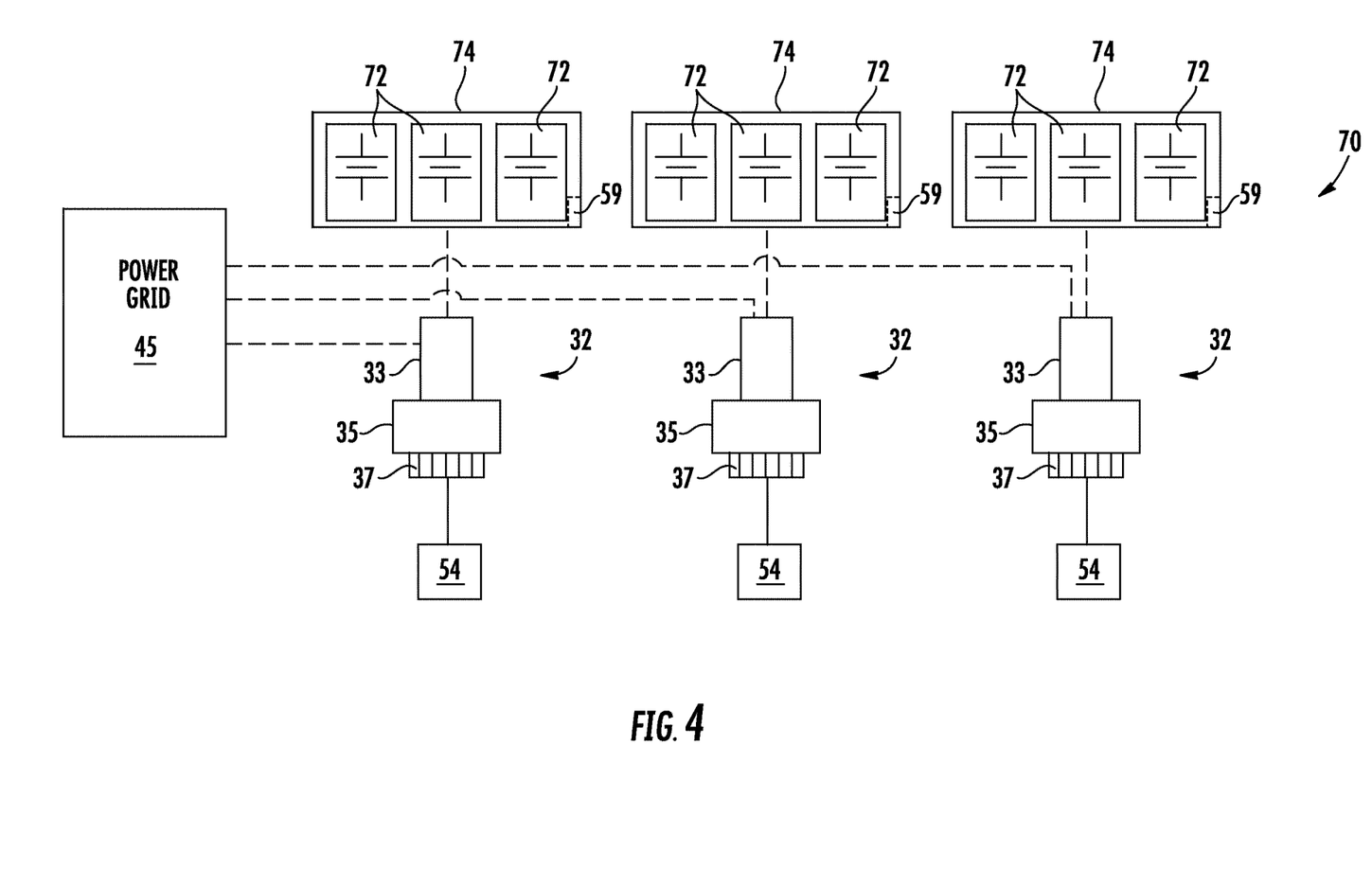
FIG. 4 illustrates a schematic diagram of one embodiment of a pitch system of a wind turbine according to the present disclosure.

Referring now to FIG. 4, a schematic diagram of one embodiment an overall pitch system 70 for the wind turbine 10 is illustrated. More specifically, as shown, the pitch system 70 may include a plurality of pitch drive mechanisms 32, i.e. one for each pitch axis 34. Further, as shown, each of the pitch drive mechanisms may be communicatively coupled to the power grid 45 as well as one or more backup batteries 72. More specifically, as shown, each pitch drive mechanism 32 may be associated with a plurality of backup batteries 72 that are stored in a battery cabinet 74. Thus, in certain embodiments, the battery cabinets 74 may be thermally isolated containers.

During normal operation of the wind turbine 10, the pitch drive motors 33 are driven by the power grid 45. However, in some instances, such as during an adverse grid event or grid loss, the pitch drive motors 33 may be driven by one or more backup batteries 72. If pitching of the rotor blades 22 relies on such batteries 72 (i.e. due to a grid loss), it is important to ensure that the batteries 72 are capable of operating when needed. Thus, the turbine controller 26 (or pitch controller 30) is configured to implement a control strategy to estimate the consumed battery life of one or more of the batteries 72 of the pitch drive mechanisms 32 so as to reduce damaging loads from occurring during an adverse grid event of a wind turbine 10 or any other scenarios where battery power is used to pitch the rotor blades 22.

Figure 5:
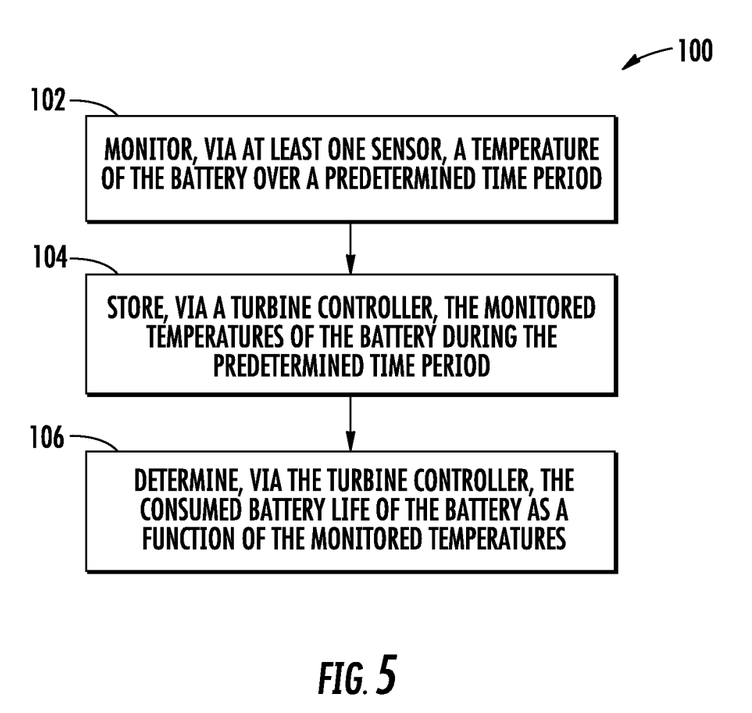
FIG. 5 illustrates a flow diagram of one embodiment of a method for estimating consumed battery life of at least one battery of a pitch drive mechanism of a rotor blade of a wind turbine according to the present disclosure.

More specifically, as shown in FIG. 5, a flow diagram of one embodiment of a method 100 for estimating consumed battery life of at least one battery 72 of the pitch drive mechanism 32 is illustrated. As shown at 102, the method 100 includes monitoring, via at least one sensor (e.g. one of the pitch sensors 59), an actual temperature of the battery 72 over a predetermined time period. More specifically, in one embodiment, the monitored temperature of the battery(ies) 72 may correspond to a cabinet temperature of the associated battery cabinet 74. As shown at 104, the method 100 also includes storing the monitored actual temperatures of the battery 72 during the predetermined time period, e.g. in the memory devices 62 of the turbine controller 26.

Since the battery 72 has a thermal time constant, the internal battery temperature will lag the measured temperature in the battery cabinet 74. To improve accuracy, the stored temperatures may be calibrated using a thermal model of the battery cabinet 74 and associated battery 72. This calibration can be made either in real time (before 104) or performed later prior to calculating the consumed life of the battery (i.e. after 104 but before 106).

As shown at 106, the method 100 includes determining the consumed battery life as a function of the monitored actual temperatures via the turbine controller 26. For example, in one embodiment, the controller 26 may be configured to determine the consumed battery life using an Arrhenius equation. As used herein, an Arrhenius equation generally refers to a formula for the temperature dependence of reaction rates. For example, in one embodiment, the Arrhenius equation may be represented by Equation (1) below:

$$k = Ae^{-Ea/(RT)} \qquad \text{Equation (1)}$$

Where
k is the rate constant,
T is the absolute temperature (in kelvins),
A is the pre-exponential factor, a constant for each chemical reaction that defines the rate due to frequency of collisions in the correct orientation,
$E_a$ is the activation energy for the reaction (in Joules mol−1), and
R is the universal gas constant.

Thus, the Arrhenius equation provides the dependence of the rate constant of a chemical reaction on the absolute temperature, a pre-exponential factor and other constants of the reaction. Additionally, an acceleration factor (AF) can be derived from the Arrhenius equation in order to obtain the variation of the consumed battery life for any battery temperature with respect to a reference temperature.

In further embodiments, the method 100 may include averaging a subset of the monitored actual temperatures for predetermined time intervals to obtain an average temperature. In such embodiments, the controller 26 can then determine the consumed battery life as a function of the average temperature. It should be understood that the predetermined time intervals may include any suitable time period, for example, ranging from about five (5) minutes to about twenty (20) minutes, e.g. such as about ten (10) minutes. In additional embodiments, the predetermined time intervals may be less than 5 minutes or greater than 20 minutes.

If the consumed battery life exceeds a predetermined threshold, the controller 26 may be configured to generate an alarm signal, such as a software alarm in the SCADA system. In this way, maintenance manuals for the batteries 72 may be modified such that battery replacement in all and/or a single axis could be completed when the alarm signal is generated. As such, the issue of the battery life being dependent on site temperature is effectively eliminated.

In one embodiment, the predetermined threshold as described herein may correspond to 80% or greater of a total battery life of the batteries 72. It should be understood, however, the predetermined threshold may also be set to be less than 80% of the total battery life of the battery 72. Accordingly, setting a minimum threshold for battery life can be useful in order to set a minimum pitch rate in case of grid loss. In other words, the present disclosure ensures all batteries 72 have more than the predetermined threshold of life left (e.g. more than 20%); therefore, the probability of having a pitch rate below a certain minimum rate (e.g. 3°/s) is also low, thereby reducing the loads for this scenario. As such, the present disclosure prevents the rotor blades 22 from becoming stuck in the instance of a grid loss.

Accordingly, the method 100 may also include replacing the battery 72 if the consumed battery life exceeds the predetermined threshold. In such embodiments, the method 100 may also include replacing all of the batteries 72 in the battery cabinet 74 if the consumed battery life of one of the batteries 72 therein exceeds the predetermined threshold. In addition, the method 100 may include replacing additional batteries 72 of pitch drive mechanisms 32 of adjacent rotor blades 22 if the consumed battery life of one of the batteries 72 in one of the battery cabinets 74 exceeds the predetermined threshold. In other words, for certain embodiments, all of the batteries 72 in an axis could be replaced at the same time to save time and costs associated with maintenance of such batteries 72. Alternatively, if all of batteries 72 for the axes were not replaced, the controller 26 may be configured to calculate the battery life left per axis using, e.g. three separate equations. Such an embodiment may be beneficial in cases where batteries 72 were replaced due to other failure modes other than wear out.

Figure 6:
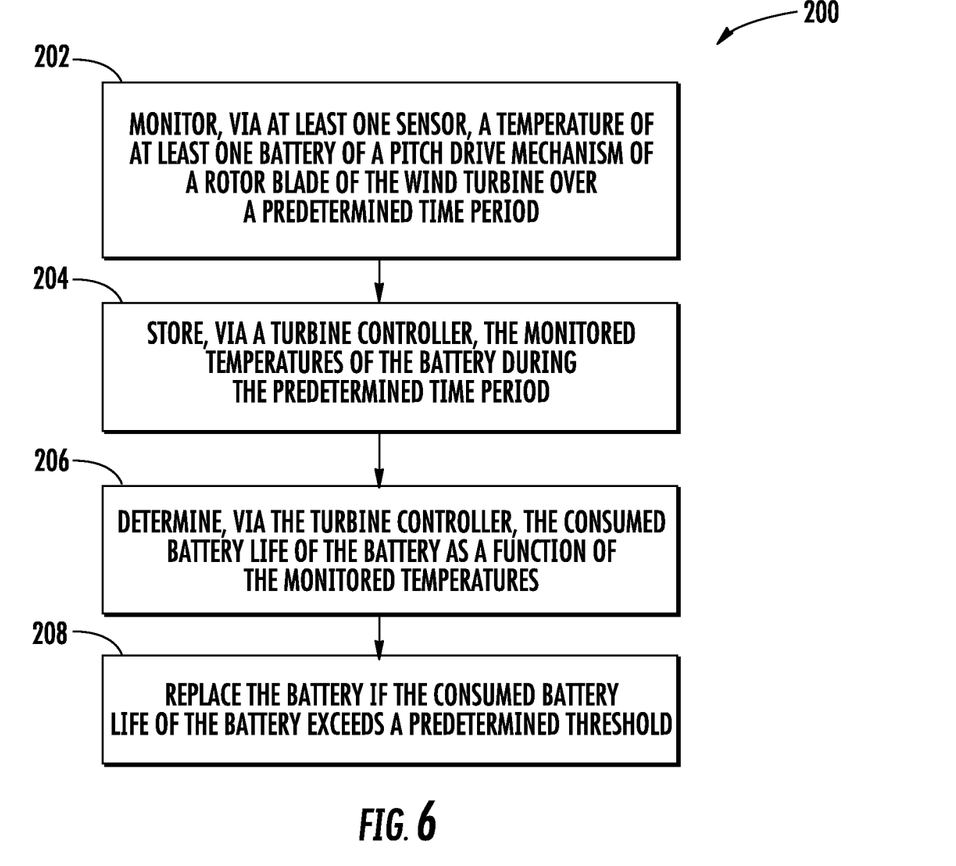
FIG. 6 illustrates a flow diagram of one embodiment of a method for preventing damaging loads from occurring during an adverse grid event of a wind turbine according to the present disclosure.

Referring now to FIG. 6, a flow diagram of one embodiment of a method 200 for preventing damaging loads from occurring during an adverse grid event of a wind turbine 10 is illustrated. As shown at 202, the method 200 includes monitoring an actual temperature of at least one battery 72 of a pitch drive mechanism 32 of a rotor blade 22 of the wind turbine 10 over a predetermined time period, e.g. via at least one sensor 59. As shown at 204, the method 200 includes storing the monitored actual temperatures of the battery 72 during the predetermined time period via the turbine controller 26, e.g. in the memory device(s) 62. As shown at 206, the controller 26 then determines the consumed battery life as a function of the monitored actual temperatures. Thus, as shown at 208, the method 200 includes replacing the battery 72 if the consumed battery life exceeds a predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating consumed battery life of at least one battery of a pitch drive mechanism of a rotor blade of a wind turbine, the at least one battery stored in a thermally-isolated battery cabinet, the method comprising:

monitoring, via at least one sensor positioned inside of the battery cabinet, an actual temperature of the battery over a predetermined time period;

storing, via a turbine controller, the monitored actual temperatures of the battery during the predetermined time period; and, determining, via the turbine controller, the consumed battery life as a function of the monitored actual temperatures.

2. The method of claim 1, further comprising calibrating the monitored actual temperatures using a thermal model of the battery cabinet and the at least one battery.

3. The method of claim 1, further comprising:
averaging a subset of the monitored actual temperatures for predetermined time intervals to obtain an average temperature; and,
determining the consumed battery life as a function of the average temperature.

4. The method of claim 1, further comprising generating, via the turbine controller, an alarm signal if the consumed battery life exceeds a predetermined threshold.

5. The method of claim 4, wherein the predetermined threshold comprises 80% or greater of a total battery life of the battery.

6. The method of claim 4, further comprising replacing the battery if the consumed battery life exceeds the predetermined threshold.

7. The method of claim 4, wherein the battery cabinet comprises a plurality of batteries stored therein, the method further comprising replacing all of the plurality of batteries in the battery cabinet if the consumed battery life exceeds the predetermined threshold.

8. The method of claim 4, further comprising replacing additional batteries of pitch drive mechanisms of adjacent rotor blades if the consumed battery life exceeds the predetermined threshold.

9. A system for estimating consumed battery life of at least one battery of a pitch drive mechanism of a rotor blade of a wind turbine, the at least one battery stored in a thermally-isolated battery cabinet, the system comprising:
at least one sensor positioned inside of the battery cabinet for monitoring an actual temperature of the battery over a predetermined time period;
a controller communicatively coupled to the at least one sensor, the controller comprising at least one processor configured to perform one or more operations, the one or more operations comprising:
storing the monitored actual temperatures of the battery during the predetermined time period; and,
determining the consumed battery life as a function of the monitored actual temperatures.

10. The system of claim 9, wherein the battery is stored in a thermally-isolated battery cabinet, the temperature of the battery corresponding to a cabinet temperature of the battery cabinet.

11. The system of claim 9, wherein the one or more operations further comprise:
averaging a subset of the monitored actual temperatures for predetermined time intervals to obtain an average temperature; and,
determining the consumed battery life as a function of the average temperature.

12. The system of claim 10, wherein the one or more operations further comprise:
generating an alarm signal if the consumed battery life exceeds a predetermined threshold.

13. The system of claim 12, wherein the predetermined threshold comprises 80% or greater of a total battery life of the battery.

14. The system of claim 12, wherein the one or more operations further comprise:
replacing the battery if the consumed battery life exceeds the predetermined threshold.

15. The system of claim 12, wherein the battery cabinet comprises a plurality of batteries stored therein, and wherein the one or more operations further comprise:
replacing all of the plurality of batteries within the battery cabinet if the consumed battery life exceeds the predetermined threshold.

16. A method for preventing damaging loads from occurring during an adverse grid event of a wind turbine, the method comprising:
monitoring, via at least one sensor positioned inside of a thermally-isolated battery cabinet, an actual temperature of at least one battery of a pitch drive mechanism of a rotor blade of the wind turbine over a predetermined time period, the at least one battery positioned inside the battery cabinet;
storing, via a turbine controller, the monitored actual temperatures of the battery during the predetermined time period;
determining, via the turbine controller, the consumed battery life as a function of the monitored actual temperatures; and,
replacing the battery if the consumed battery life exceeds a predetermined threshold.

17. The method of claim 16, further comprising replacing additional batteries of pitch drive mechanisms of adjacent rotor blades if the consumed battery life exceeds the predetermined threshold.

* * * * *